A. A. PAGE.
LOCK.
APPLICATION FILED AUG. 17, 1915.

1,229,319.

Patented June 12, 1917.
6 SHEETS—SHEET 1.

WITNESS
F. A. Carlson

INVENTOR
Albert A. Page
BY
ATTORNEY

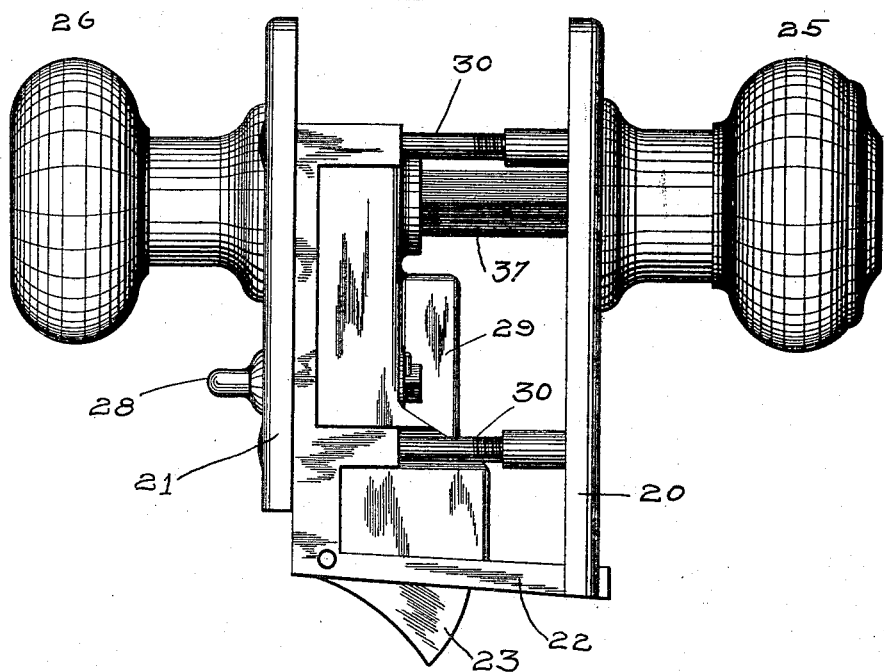
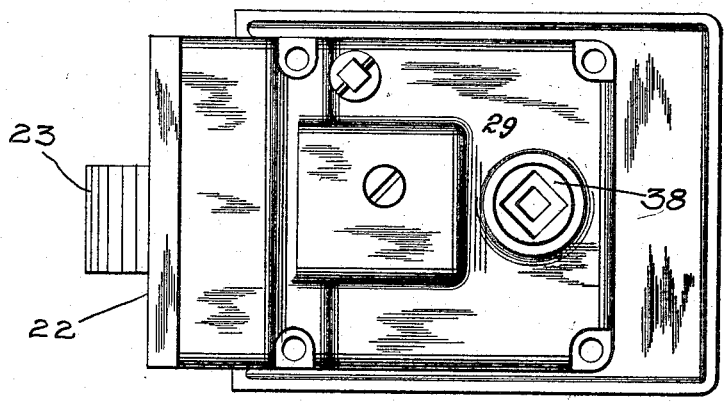

A. A. PAGE.
LOCK.
APPLICATION FILED AUG. 17, 1915.
1,229,319.
Patented June 12, 1917.
6 SHEETS—SHEET 3.
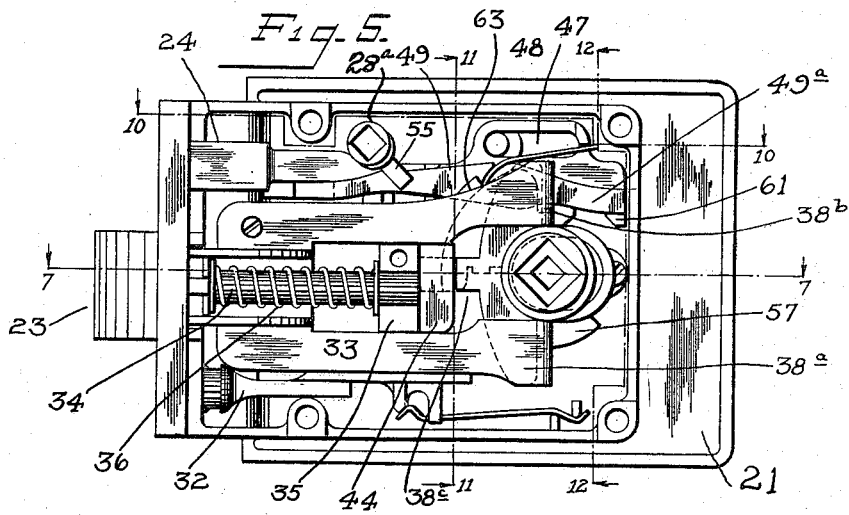
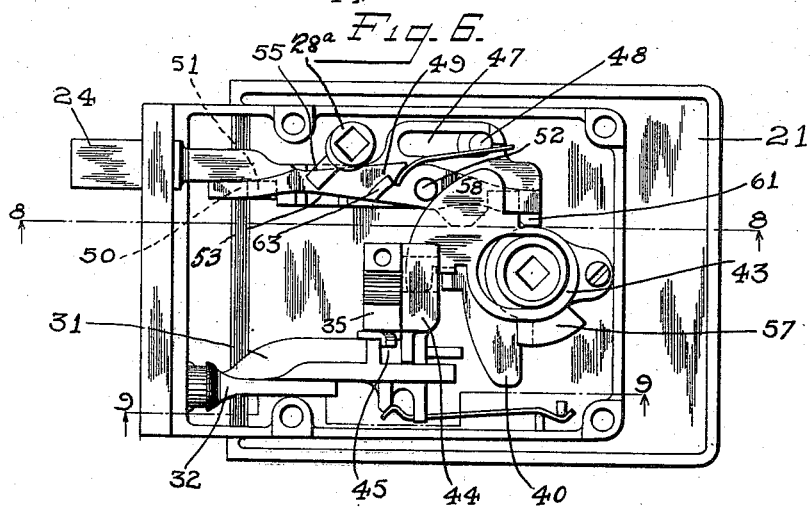
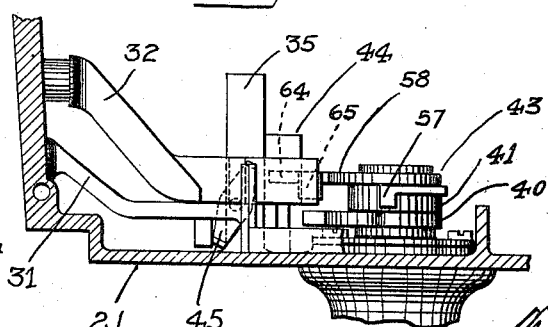
WITNESS
F. A. Carlson
INVENTOR
Albert A. Page
BY
ATTORNEY A. A. PAGE.
LOCK.
APPLICATION FILED AUG. 17, 1915.
1,229,319.
Patented June 12, 1917.
6 SHEETS—SHEET 4.
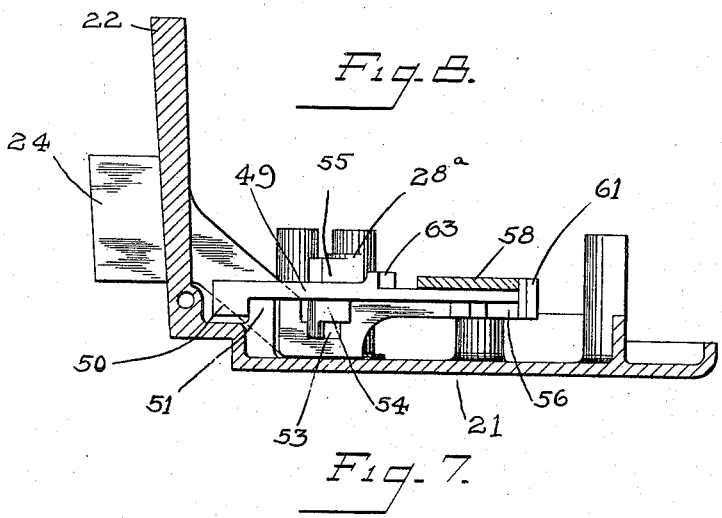
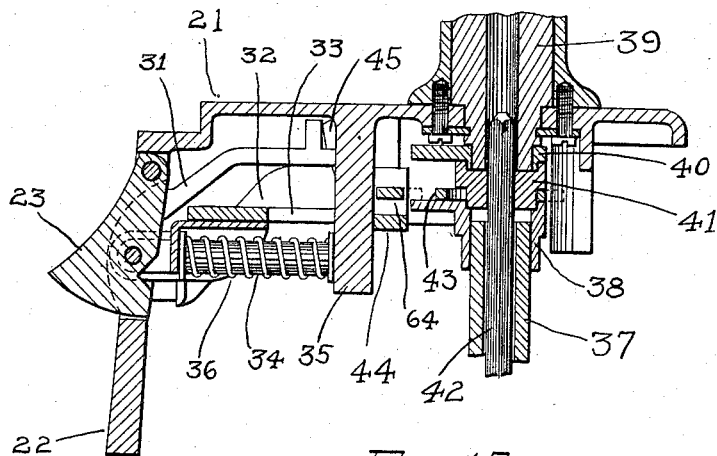
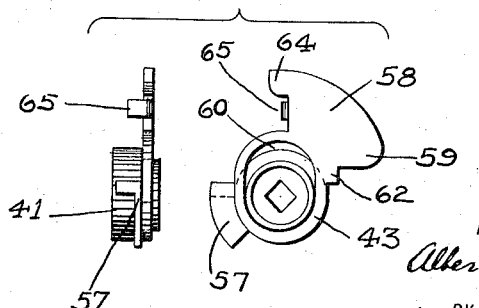
WITNESS
F. A. Carlson
INVENTOR
Albert A. Page
BY
ATTORNEY A. A. PAGE.
LOCK.
APPLICATION FILED AUG. 17, 1915.
1,229,319.
Patented June 12, 1917.
6 SHEETS—SHEET 5.
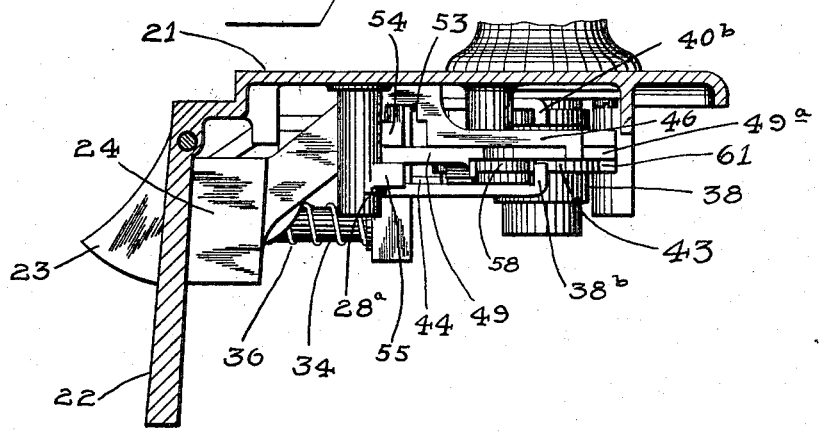
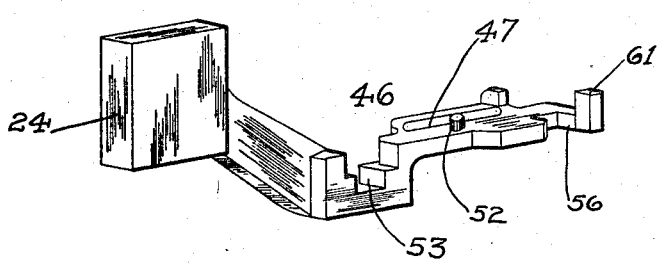
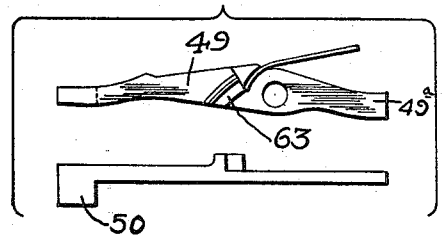
WITNESS.
F. A. Carlson
INVENTOR.
Albert A. Page
BY
ATTORNEY

A. A. PAGE.
LOCK.
APPLICATION FILED AUG. 17, 1915.

1,229,319. Patented June 12, 1917.
6 SHEETS—SHEET 6.

WITNESS
F. A. Carlson

INVENTOR
Albert A. Page
BY
ATTORNEY

UNITED STATES PATENT OFFICE.

ALBERT A. PAGE, OF EAST HAVEN, CONNECTICUT, ASSIGNOR TO SARGENT & COMPANY, OF NEW HAVEN, CONNECTICUT, A CORPORATION OF CONNECTICUT.

LOCK.

1,229,319.

Specification of Letters Patent.

Patented June 12, 1917.

Application filed August 17, 1915. Serial No. 45,998.

*To all whom it may concern:*

Be it known that I, ALBERT A. PAGE, a citizen of the United States, residing at East Haven, county of New Haven, and State of Connecticut, have invented certain new and useful Improvements in Locks, of which the following is a full, clear, and exact description.

This invention relates to locks and more particularly to that type of lock wherein the operating parts are carried by side plates or escutcheons and the key mechanism operable from the outside of the door is housed in the outside knob. The invention also has special reference to a lock of this type in which the key mechanism is adapted to operate the dead bolt as well as a latch bolt.

One of the primary objects of the invention is to furnish simple and efficient mechanism for operating both bolts by a key. Another object of the invention is to furnish a very compact arrangement of parts for protracting the dead bolt as the key is turned in one direction, and for retracting the dead bolt and then the latch bolt as the key is turned in the opposite direction.

To these and other ends, the invention consists in the novel features and combinations of parts to be hereinafter described and claimed.

In the accompanying drawing,

Fig. 3 is a top plan view of the lock.

Fig. 4 is an inside view of the inner escutcheon.

Fig. 5 is a view similar to Fig. 4, with the cover plate removed.

Fig. 6 is a view of the interior mechanism of the lock with the latch bolt and its retracting means omitted, the dead bolt being protracted by means of the thumb turn hub.

Fig. 7 is a section on line 7—7 of Fig. 5.

Fig. 8 is a section on line 8—8 of Fig. 6.

Fig. 9 is a section on line 9—9 of Fig. 6.

Fig. 10 is a section on line 10—10 of Fig. 5.

Fig. 16 is a detail perspective of the dead bolt.

Figure 1:
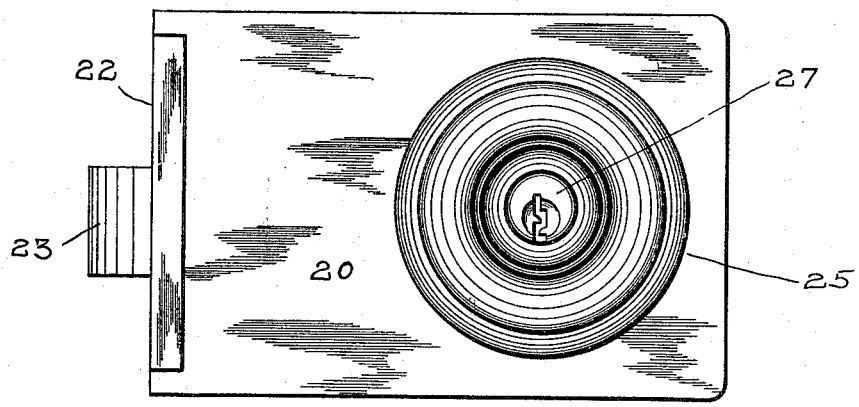
Figure 1 is an elevation of a lock embodying my improvements, looking toward the outside knob.
Figure 2:
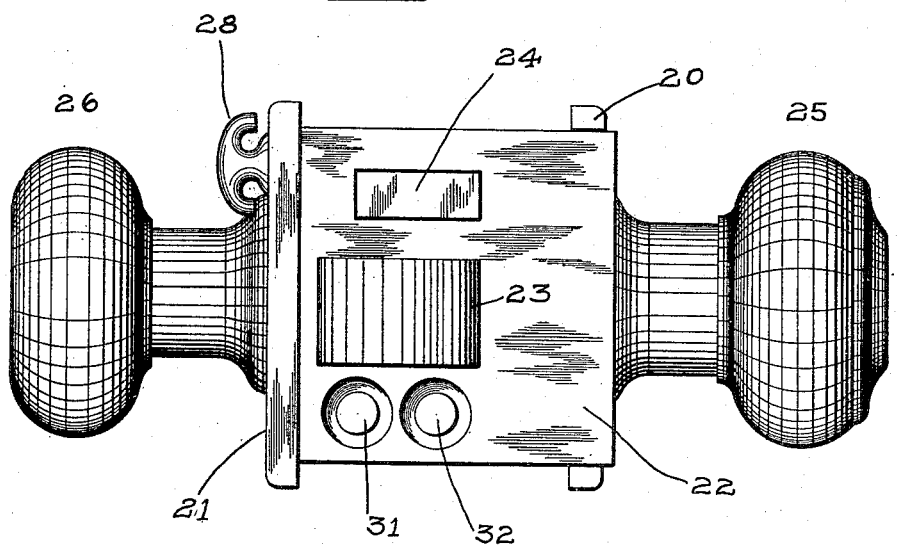
Fig. 2 is an elevation looking toward the face plate.
Figure 11:
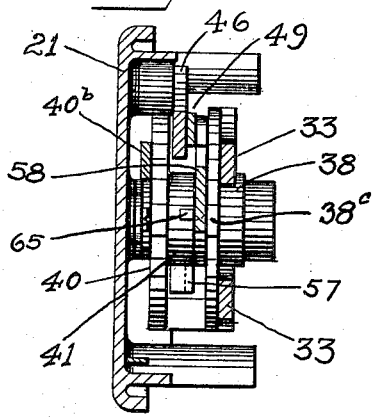
Fig. 11 is a section on line 11—11 of Fig. 5.
Figure 12:
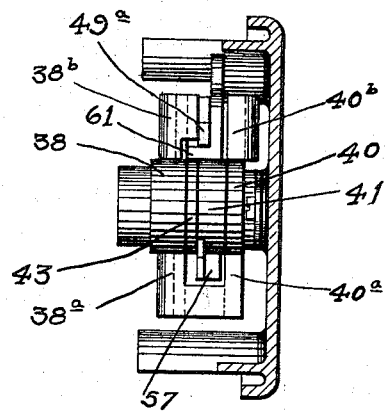
Fig. 12 is a section on line 12—12 of Fig. 5.
Figure 13:
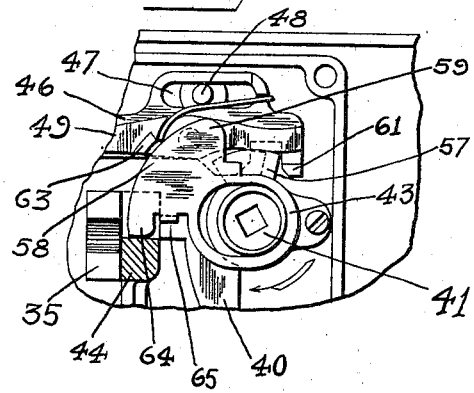
Fig. 13 is a fragmentary detail of certain parts illustrated in Fig. 6, showing the dead bolt partly retracted by the key mechanism.

Fig. 17 comprises details of the dead bolt tumbler, and

Fig. 18 comprises details of the key operated hubs for operating the dead bolt and latch bolt respectively.

The lock selected for illustration comprises an outside escutcheon or side plate 20, an inside escutcheon or side plate 21, a face plate 22 projecting from the plate 21 across the front edge of plate 20, a latch bolt 23 projecting through the face plate, a dead bolt 24 projecting through the face plate, an outside knob 25 for retracting the latch bolt, an inside knob 26 for retracting the latch bolt, both of said knobs carried by the respective escutcheons 20 and 21, a key mechanism for operating the latch bolt and dead bolt, including a lock 27 in the outside knob, and a thumb turn 28 on the inside escutcheon for protracting and retracting the dead bolt.

In the form shown, the bolts 23 and 24 are carried by the inside escutcheon 21 and the operating mechanism for said bolts is protected by a cover plate 29. The escutcheons are adjustably interconnected by means of screws 30 so that the lock is adapted to doors of different thickness. The usual stop-work or night latch mechanism, including a dogging slide 31 and a releasing slide 32, is accessible at the face plate for dogging and releasing the outside knob 25.

Figure 15:
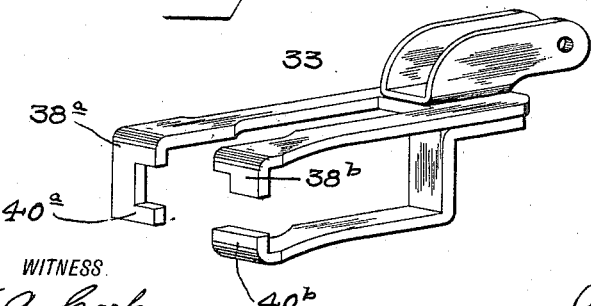
Fig. 15 is a perspective view of the latch bolt yoke.

The latch bolt 23 is pivoted to the face plate and is retractable by a yoke member 33 (Fig. 15). The latch bolt is guided in its forward and rearward movement by a shank or stem 34 pivoted to the bolt head and fitting a seat in a post or standard 35. A spring 36, embracing the shank 34 between the post and the bolt head, normally holds the latter in the protracted position.

The yoke 33 coöperates with certain retracting hubs operable from the outside and inside knobs and the lock 27 respectively.

All of these hubs, in the form shown, are carried by the inside escutcheon and held in place thereon by the cover plate 29. The outside knob 25 has a hollow spindle 37 non-rotatively engaged with a hub 38, and the inside knob has a hollow spindle 39 non-rotatively engaged with a hub 40. Interposed between the hubs 38 and 40 is a dead bolt retracting hub 41 operable by the key mechanism, which includes a key rod 42 extending from the lock 27 through the hollow spindle 37 into locking engagement with the hub 41. The hub 41, operable by the key, is, in turn, adapted to actuate a latch retracting hub 43 interposed between the hub 41 and the hub 38. All of these hubs 38, 40, 41 and 43, are nested together in the relation shown in Fig. 7 and supported against the spindle of the inside knob by the cover plate 29, which fits over the hub 38 and holds the parts in place. The outside hub 38 is adapted to coöperate with portions 38$^a$, 38$^b$, of the yoke 33, while the inside hub 40 is adapted to coöperate with portions 40$^a$, 40$^b$, on said yoke, so that as either hub is turned in either direction the latch bolt will be retracted. The stop-work mechanism may be adjusted to dog the outside hub 38 and the outer knob by moving inwardly the slide or button 31, which carries a lateral extension 44 notched to interlock with a projection 38$^c$ on the hub 38. The slides 31, 32, are connected by the usual walking beam 45 (Fig. 9) so that the hub 38 will be released by pushing in the releasing slide 32.

The dead bolt 24 is located in close proximity to the latch bolt and in the form shown is provided with a rigid shank 46 disposed above and parallel to the major portion of the retracting yoke 33. The dead bolt is guided on the case by means of a slot 47 engaged by a post 48 cast on the escutcheon 21. The bolt bodily carries a tumbler 49 having a projection 50 at the forward end thereof adapted to coöperate with a post or fence 51 on the case located near the face plate 22. The tumbler 49 is pivoted on the bolt by means of a pin 52 carried by the latter, said pin located intermediate of the ends of the tumbler. In the forward portion of the bolt shank 46 is a transverse groove 53 providing shoulders or talons and adapted to be engaged by a finger or wing 54 on the hub 28$^a$ of thumb turn member 28. A wing-like projection 55 on the hub 28$^a$ holds the tumbler 49 against the wing 54 and prevents displacement of the tumbler. Intermediate the wings 54, 55, is a portion on the thumb turn hub which is adapted to bear against and depress the forward end of the tumbler so as to cause it to disengage the fence 50. At the rear end of the bolt shank 46, a notch 56 is provided which forms talons coöperating with a wing 57 on the hub 41. The wing 57 is also adapted to engage the rear extremity 49$^a$ of tumbler 49 and thereby release the tumbler with respect to the fence 51. Consequently by turning the hub 41 in one direction by means of the key rod 42 the dead bolt will be protracted and on turning the key in the opposite direction the dead bolt will be retracted. The latch retracting hub 43 is provided with a wing 58 having a nose 59 located alongside one terminal of the wing of the outside hub 38 and adapted to coöperate with the portion 38$^b$ of the yoke. As the hub 43 is turned in a clockwise direction (Fig. 5) the nose 59 will abut and draw back the yoke portion 38$^b$ and thereby retract the latch bolt. The hub 43 is displaceable forwardly and rearwardly with respect to the other hubs, for which purpose it is provided with an elongated opening 60, extending around and bearing on a portion of the hub 41 as shown in Fig. 18. The hub 43 may be moved forwardly and rearwardly with respect to hub 41 by means of the dead bolt, which is provided at the rear portion with a projection 61 to contact with and carry along a projection 62 on the hub 43. In this manner, the dead bolt when protracted moves the hub 43 toward the front of the case. On the other hand, when the dead bolt is retracted, a projection 63 on the tumbler 49 engages the curved edge of the wing 58 and thereby slides the hub 43 back to the initial position.

It will be observed that the shank of the dead bolt is located quite close to the yoke 33 and the several hubs, and that in fact the dead bolt shank operates in the space between the yoke ends 38$^b$, 40$^b$, and between the wings of the outside and inside knob hubs. The wing 58 of the latch retracting hub 43 is supported in proximity to the coöperating portion 38$^b$ of the yoke by suitable means. In the example illustrated, the extension 44 on the night latch slide 31 is utilized for this purpose, being provided with a part on which a portion 64 of the wing 58 is adapted to rest, irrespective of the shifting movement of the night latch slide 31, so that the wing 58 will not fall out of proximity to the coöperating portion of the yoke. The hub 43 with its wing 58 is adapted to be operated from the key rod 42 through the medium of the hub 41, for which purpose the wing 57 for operating the dead bolt is adapted to contact with a projection 65 on the wing 58, as hereinafter described.

Figure 14:
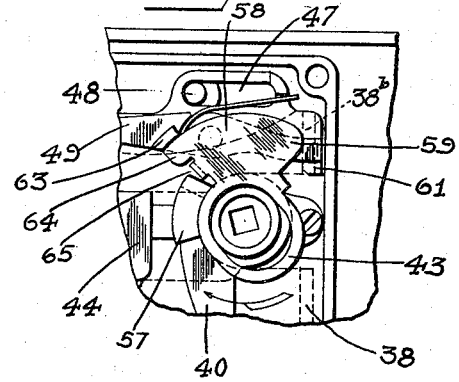
Fig. 14 is a similar view showing the dead bolt fully retracted by the key mechanism and the operation of retracting the latch bolt by the key mechanism.

The operation of the lock will be obvious for the most part from the foregoing description. It is apparent that the dead bolt may be protracted and retracted by the thumb turn 28 independently of the key mechanism. In this case the tumbler 49 is operated from the forward end portion thereof by means of the thumb turn hub as previously explained. On the other hand, the dead bolt is operable by the key mechanism independently of the thumb turn by suitable actuation of the hub 41 and its wing 57, which coöperate with the dead bolt and tumbler at the rear ends of the same. Supposing the dead bolt to have been projected by the thumb turn hub as shown in Fig. 6, it may be retracted by turning the key in a clockwise direction. It will be noted that when the dead bolt is in its forward position, the latch retracting hub 43 is also in its forward position; thus when the hub 41 is turned, it will clear the projection 65 on the hub 43 and pass into contact with the coöperating talons of the dead bolt. However, as the wing 57 moves the dead bolt rearwardly the projection 63 on the tumbler 49 in impinging against the forward edge of the wing 58 shifts the hub 43 rearwardly on the hub 41 and moves the projection 65 into such a position that as the rotation of the hub 41 is continued, the wing 57 will take up against the projection 65 and shift the hub 43 in a clockwise direction (Fig. 14). Thus, after the dead bolt has been retracted, the latch bolt is retracted as the rotation of the key is continued.

Various changes in the details of the construction will be made without departing from the scope of the invention as defined in the claims.

What I claim is:

1. In a lock, the combination of side plates or escutcheons, a face plate carried by one of said side plates, a latch bolt projecting through said face plate, a dead bolt projecting through said face plate, knobs carried by the respective side plates, one of said knobs having a lock therein, hubs connected with the respective knobs for retracting the latch bolt, a dead bolt actuating hub connected with the knob lock and a separate latch bolt actuating hub arranged for operation by said knob lock; substantially as described.

2. In a lock, the combination of side plates or escutcheons, a face plate carried by one of said side plates, knobs fixed to the respective side plates, hubs attached to said knobs, a latch bolt projecting through the face plate adapted for retraction by said hubs, a lock in one of said knobs having a key rod, a dead bolt projecting through said face plate, a hub operated by said key rod to protract and retract said dead bolt, and a separate hub operable from the key rod for retracting the latch bolt; substantially as described.

3. In a lock, the combination of side plates or escutcheons, a face plate carried by one of said side plates, knobs fixed to the respective side plates, hubs attached to said knobs, a latch bolt projecting through the face plate adapted for retraction by said hubs, a lock in one of said knobs having a key rod, a dead bolt projecting through said face plate, a hub operated by said key rod to protract and retract said dead bolt, a separate hub operable from the key rod for retracting the latch bolt, the hubs operable from the knob lock being interposed between the knob hubs, and all of said hubs being carried by one of said side plates.

4. In a lock, the combination of a latch bolt, a dead bolt, a hub for protracting and retracting the dead bolt, and a separate latch bolt retracting hub operable by said dead bolt hub; substantially as described.

5. In a lock, the combination of two bolts, a hub for retracting one of said bolts, a hub for retracting the other bolt, said second hub being operable by said first hub when the former occupies a definite position, and means for shifting the second hub relatively to the first hub; substantially as described.

6. In a lock, the combination of two bolts, a hub for retracting one of said bolts, a hub for retracting the other bolt and for operating the first named hub, one of said bolts adapted to shift one of said hubs into and out of coöperation with the other hub; substantially as described.

7. In a lock, a latch bolt, a deadbolt having talons, a hub for retracting the latch bolt, and a hub for engaging said talons to operate the deadbolt, engageable with said latch bolt hub to retract the latch bolt; substantially as described.

8. In a lock, the combination of a latch bolt, a dead bolt, a hub for retracting the latch bolt, a hub for retracting the dead bolt, said latch bolt hub being shiftable relatively to said dead bolt hub and being operable by the latter when the former occupies a definite position, and means for moving the latch bolt hub into and out of coöperation with the dead bolt hub; substantially as described.

9. In a lock, the combination of a latch bolt, a dead bolt, a hub for retracting the latch bolt, a hub for retracting the dead bolt, said latch bolt hub being shiftable relatively to said dead bolt hub and being operable by the latter when the former occupies a definite position, and means for moving the latch bolt into and out of coöperation with the dead bolt hub as the dead bolt is retracted and protracted respectively; substantially as described.

10. In a lock, the combination of a latch bolt, a dead bolt, a hub for operating the dead bolt, a hub for retracting the latch bolt having a part loosely supported on said dead bolt hub so that the latch bolt hub is adapted to be shifted to clear the dead bolt hub or be operated thereby, and projections carried by the dead bolt for moving the latch bolt hub into and out of coöperation with the dead bolt hub in correspondence with the movements of the dead bolt; substantially as described.

11. In a lock, the combination of two bolts, a hub for retracting one of said bolts, a hub for retracting the other bolt and operating the first named hub, means for shifting said hubs relatively to each other, and a key rod for actuating said second named hub; substantially as described.

12. In a lock, the combination of side plates or escutcheons, a face plate carried by one of said side plates, knobs carried by the respective side plates, hubs attached to the respective knobs, a latch bolt projecting through the face plate adapted for retraction by said hubs, a dead bolt carried by one of said side plates having two pairs of talons, a tumbler for said dead bolt, a thumb turn hub for engaging the tumbler and one pair of talons, a key hub for engaging the tumbler and the other pair of talons, and a lock in one of said knobs having a key rod connected with said key hub; substantially as described.

13. In a lock, a latch bolt, a dead bolt having a pair of talons, a tumbler for said bolt, a hub to coöperate with said talons and said tumbler to protract and retract the dead bolt, and a latch bolt retracting hub adapted to be operated by said first named hub; substantially as described.

14. In a lock, a latch bolt, a dead bolt having a pair of talons, a tumbler for said dead bolt, a hub for operating the dead bolt adapted to engage said tumbler and said talons, a latch bolt retracting hub bodily movable relatively to the first hub and adapted to be operated by the latter when said latch bolt hub occupies a definite position, and means for shifting the latch bolt hub into and out of coöperation with the dead bolt hub when the dead bolt is retracted and protracted respectively; substantially as described.

15. In a lock, the combination of a latch bolt, a latch bolt retracting slide, an inner knob having a hub to operate said slide, an outer knob having a hub to operate said slide, a deadbolt having talons, a third latch bolt-operating hub intermediate the first two hubs, a key mechanism, and a hub operated by said key mechanism for engaging said talons of the deadbolt to operate said bolt, said last-named hub engageable with said third hub to retract the latch bolt when the deadbolt has been retracted; substantially as described.

In witness whereof, I have hereunto set my hand on the 14th day of August, 1915.

ALBERT A. PAGE.

Copies of this patent may be obtained for five cents each, by addressing the "Commissioner of Patents, Washington, D. C."